United States Patent
Petersson et al.

(10) Patent No.: US 8,228,693 B2
(45) Date of Patent: Jul. 24, 2012

(54) DC FILTER AND VOLTAGE SOURCE CONVERTER STATION COMPRISING SUCH FILTER

(75) Inventors: Anders Petersson, Ludvika (SE); Lin Jiang, Ludvika (SE)

(73) Assignee: ABB Technology Ltd., Zürich (CH)

( * ) Notice: Subject to any disclaimer, the term of this patent is extended or adjusted under 35 U.S.C. 154(b) by 558 days.

(21) Appl. No.: 12/438,756

(22) PCT Filed: Aug. 25, 2006

(86) PCT No.: PCT/SE2006/000976
§ 371 (c)(1),
(2), (4) Date: Aug. 24, 2009

(87) PCT Pub. No.: WO2008/024039
PCT Pub. Date: Feb. 28, 2008

(65) Prior Publication Data
US 2009/0303759 A1     Dec. 10, 2009

(51) Int. Cl.
*H02J 3/36*      (2006.01)
(52) U.S. Cl. .......................................... 363/35
(58) Field of Classification Search .............. 363/37, 363/41, 51, 63, 35
See application file for complete search history.

(56) References Cited

U.S. PATENT DOCUMENTS

| | | |
|---|---|---|
| 4,638,416 A | 1/1987 | Neupauer et al. |
| 2009/0033439 A1* | 2/2009 | Igarashi ................. 333/185 |

FOREIGN PATENT DOCUMENTS

| | | |
|---|---|---|
| EP | 1174993 | 1/2002 |
| GB | 1535741 A | 12/1978 |
| WO | WO 96/01517 A1 | 1/1996 |
| WO | WO 2005/067118 A1 | 7/2005 |

OTHER PUBLICATIONS

Anders Lindberg, "PWM and Control of Two and Three Level High Power Voltage Source Converters," *Royal Institute of Technology, Department of Electric Power Engineering, Division of High Power Electronics*, pp. 1-106 (plus Appendix A, pp. A.1-A.10) Stockholm, Sweden (1995).
PCT/ISA/210—International Search Report—Mar. 27, 2007.
PCT/IPEA/409—International Preliminary Report on Patentability—Jun. 30, 2008.

* cited by examiner

*Primary Examiner* — Adolf Berhane
*Assistant Examiner* — Yemane Mehari
(74) *Attorney, Agent, or Firm* — Venable LLP; Eric J. Franklin

(57) ABSTRACT

The resistors of a filter block in a voltage source converter station are connected with a floating neutral point.

3 Claims, 2 Drawing Sheets

DC FILTER AND VOLTAGE SOURCE CONVERTER STATION COMPRISING SUCH FILTER

CROSS-REFERENCE TO RELATED APPLICATIONS

This application is the national phase under 35 U.S.C. §371 of PCT/SE2006/000976 filed 25 Aug. 2006.

FIELD OF INVENTION

The present invention relates generally to DC filters and more particularly to a DC filter for use in a voltage source converter based HVDC transmission system. The invention also relates to a voltage source converter station comprising such filter.

BACKGROUND

Voltage source converters (VSC) are used for example in high voltage direct current (HVDC) systems, and also as Static Var Compensators (SVC). In the HVDC application, the voltage source converter is coupled between a direct current link and an alternating current network, and in the second application between a direct voltage source and an alternating current network. In both these applications, the voltage source converter must be able to generate an alternating current (AC) voltage of the same frequency as that of the alternating current network. The reactive and the active power flow through the converter is controlled by modulating the amplitude and the phase position, respectively, of the generated AC voltage in relation to the voltage of the alternating current network.

In particular the coming into being of voltage source converters equipped with series-connected transistors (IGBT) has made it possible to use this type of converters for comparatively high voltages, and pulse width modulation (PWM) for control of the generated AC voltage enables a very fast control of that voltage.

For a general description of controls systems for voltage source converters reference is made to Anders Lindberg: PWM and Control of Two and Three Level High Power Voltage Source Converters. Royal Institute of Technology, Department of Electric Power Engineering. Stockholm 1995, in particular pages 1, 21-56, 77-106, and appendix A, which are hereby incorporated by reference.

FIG. 1 shows in the form of a schematic block diagram the DC side of a voltage source converter (in the following VSC) station in a high voltage direct current transmission system as known in the prior art. A first and a second converter station STN1 and STN2 respectively, are coupled to each other via a direct current link having two pole conductors W1 and W2. Typically, the pole conductors are cables but they may also, at least to a part, be in the form of overhead lines. Although only the first VSC station will be described in detail, it will be appreciated that the second station can be of the same design.

The converter station has capacitor equipment C1 coupled between the pole conductors to stabilize the pole to pole voltage. Smoothing reactors S1 are provided in the pole lines to stabilize the pole currents. Furthermore, a zero sequence reactor S2 is provided to ensure that the pole currents flowing to and from the VSC station in the two pole lines are in balance. The VSC station further comprises a voltage source converter VSC1 having semiconductor valves in a per se known bridge connection, such as, for example, a 2-level or a 3-level converter bridge as described in Anders Lindberg on pages 8-16. The semiconductor valves comprise, in a way known per se, branches of gate turn on/turn off semiconductor elements, for example power transistors of so-called IGBT-type, and diodes in anti-parallel connection with these elements. The voltage source converter is connected to a three-phase alternating current electric power network N1 via filters, inductors, and transformers etc., schematically shown as block COMP1.

The converter station comprises control equipment (not shown) for generation of trains of turn on/turn off orders to the semiconductor valves according to a predetermined pulse width modulation pattern.

When using a VSC comprising switchable semiconductors, such as IGBTs, the switching of the semiconductors introduces harmonic currents on the DC side of the VSC. These harmonic currents should preferably be filtered in the VSC station in order to restrict cable stresses and to minimize interference to telephone subscriber and similar signaling systems.

To reduce harmonic currents, a first filter block F1 is arranged between the two pole conductors W1, W2. This filter block is thus arranged to filter harmonics produced from pole to pole, i.e., pole mode harmonic currents.

Second filter blocks F2 are also arranged on the DC side of the VSC station. These second filter blocks are arranged between each pole conductor W1 and W2, respectively, and ground in order to filter harmonics from the AC side and injected to the DC side i.e., ground mode harmonic currents.

It is desirable to minimize the number of components in the VSC station since costs and size etc. increase with the number of components.

SUMMARY OF THE INVENTION

An object of the present invention is to provide a DC filter for a voltage source converter VSC station wherein the number of components is minimized.

The invention is based on the realization that the pole mode and ground mode filters can be combined into one single filter, reducing the number of components, in turn resulting in reduced costs, size etc.

According to a first aspect of the invention there is provided a DC filter for use in a voltage source converter based HVDC transmission system comprising a first and a second pole line, said filter comprising a first connection point connected to the first pole line and a second connection point connected to the second pole line, characterized in that the filter comprises a third connection point connected to ground.

According to a second aspect of the invention, there is provided a converter station comprising such a DC filter.

A DC filter and a converter station are thus provided, wherein the number of filter components are reduced.

In a preferred embodiment, two LC filters are serially connected between a first and a second connection point arranged for connection to the first and second pole lines, respectively and an inductor is provided between ground and the junction between the two LC filters. This provides a simple and cost-efficient design for the inventive DC filter.

Further preferred embodiments are defined by the dependent claims.

BRIEF DESCRIPTION OF DRAWINGS

The invention is now described, by way of example, with reference to the accompanying drawings, in which.

DETAILED DESCRIPTION OF A PREFERRED EMBODIMENT

In the following a detailed description of a preferred embodiment of the present invention will be given with reference to FIGS. 2-5. In this description, the term "high voltage" will be used for voltages of 50 kV and higher. Today, the upper limit in commercial high voltage devices is 800 kV but even higher voltages, such as 1000 kV or more, are already built or envisaged in the near future.

Figure 1:
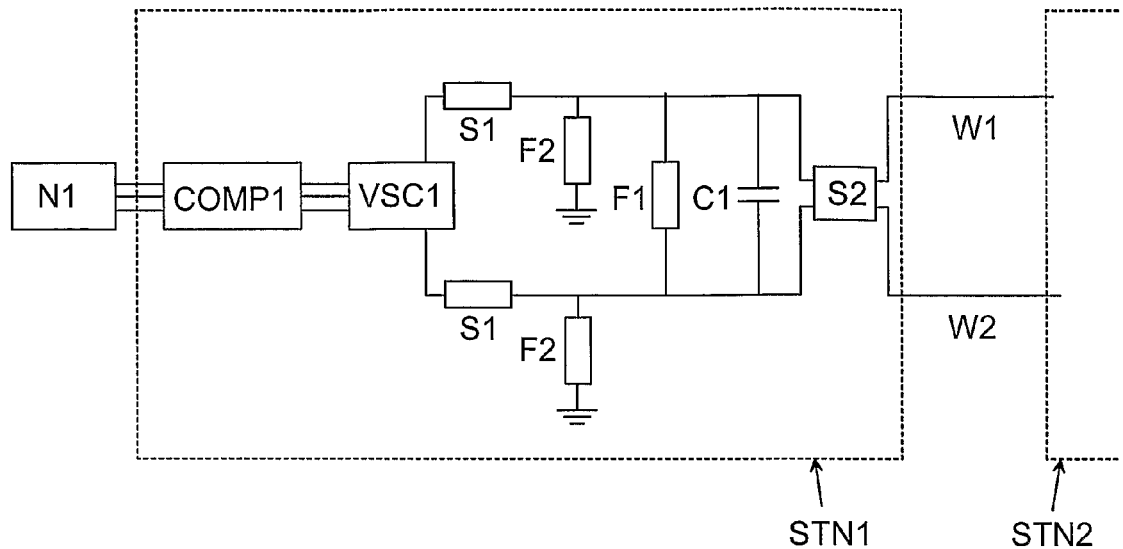
FIG. 1 shows in the form of a schematic block diagram a high voltage direct current transmission system as known in the prior art.
Figure 2:
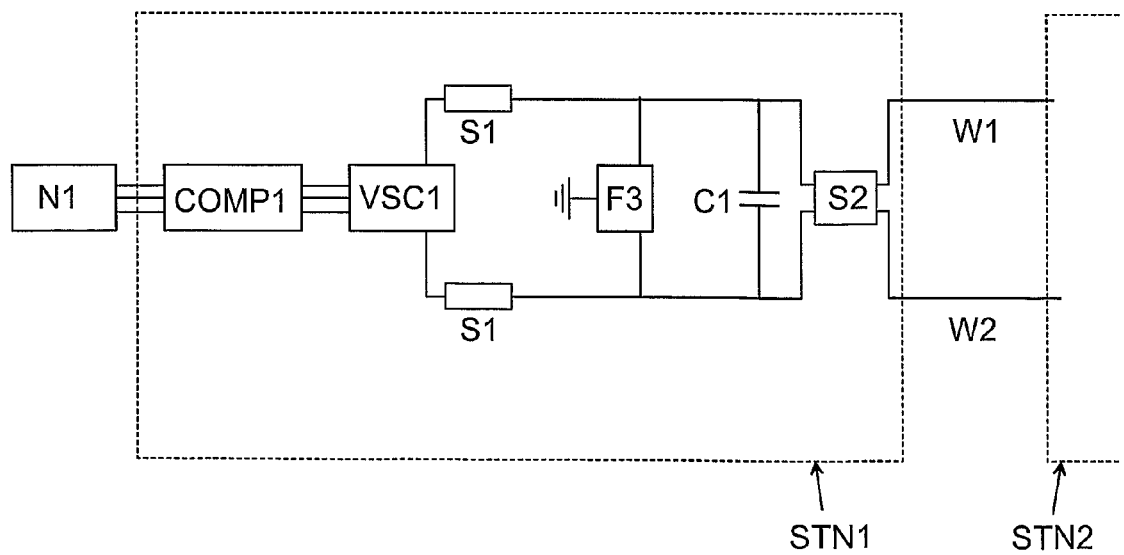
FIG. 2 is a diagram similar to that of FIG. 1 but showing a VSC station according to the invention.

The overall structure of the VSC station STN1 according to the invention is similar to that of the VSC station described above in the background section. Thus, the VSC station of FIG. 2 is coupled to a direct current link having two pole conductors W1 and W2 respectively. The converter station has capacitor equipment C1 coupled between the pole conductors, and comprises a voltage source converter VSC1 having semiconductor valves controlled by means of control equipment (not shown). The voltage source converter is via component block COMP1 coupled to a three-phase alternating current electric power network N1. Smoothing reactors S1 stabilize the pole currents and a zero sequence reactor S2 ensures balancing of the pole currents.

A DC filter block F3 is provided with a first connection point connected to the first pole line W1 and a second connection point connected to the second pole line W2. A third connection point of the filter block F3 is connected to ground. This means that a single filter block is used for both the pole mode harmonics and the ground mode harmonics.

Figure 3:
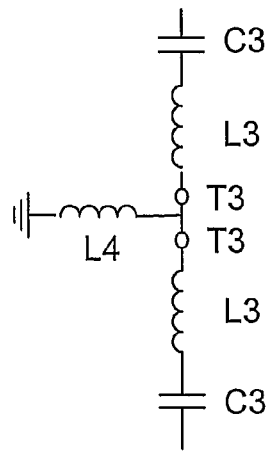
FIG. 3 shows a detailed diagram of a DC filter block shown in FIG. 2.

A detailed diagram of the DC filter block F3 is shown in FIG. 3. The filter block comprises two LC filters consisting of serially connected inductors and capacitors L3, C3. The LC filters are serially connected between a first and a second connection point arranged for connection to the first and second pole lines W1, W2, respectively.

An inductor L4 is provided between ground and the junction between the two LC filters.

Figure 4:
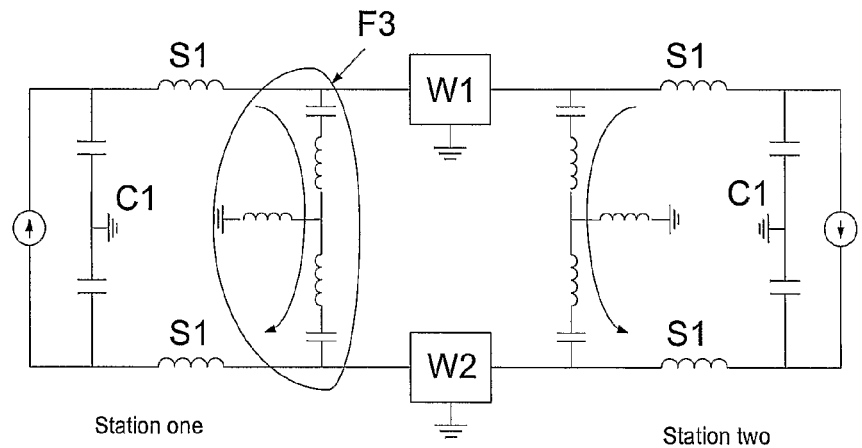
FIGS. 4 and 5 show pole and ground mode modeling of the DC harmonic calculation.
Figure 5:
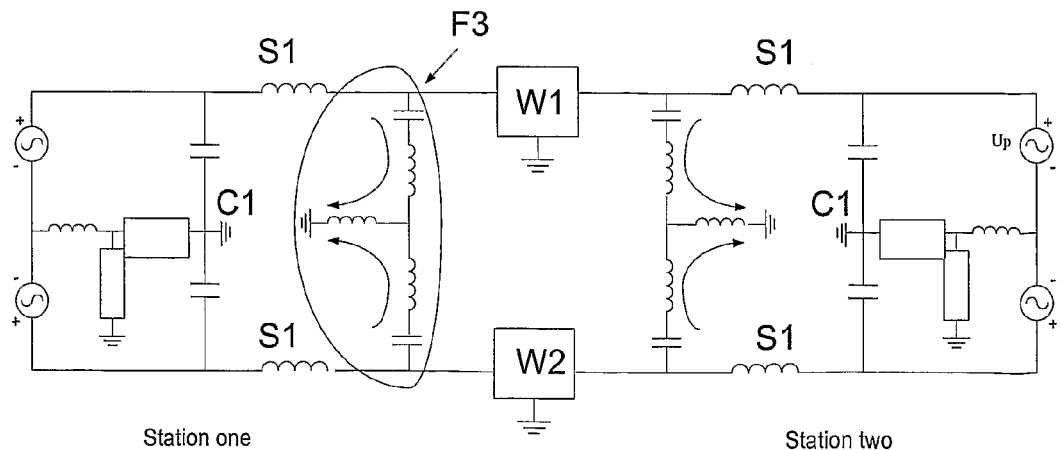

The function of the filter block F3 will now be explained with reference to FIG. 4, showing pole mode modeling for DC side harmonic calculation, and FIG. 5, showing ground mode modeling for DC side harmonic calculation. In FIG. 4 it is seen that the two LC filters L3, C3, which are serially connected between the two pole lines W1, W2, are active for filtering pole mode harmonic currents. In FIG. 5 it is seen that the series connection of one of the LC filters L3, C3 and inductor L4 are active for filtering ground mode harmonic currents.

The ratings of the different components in the filter block F3 must be chosen so that suitable filter characteristics are obtained for both pole mode and ground mode harmonic currents.

If $\Omega_{pm}$ and $\Omega_{gm}$ are the pole and ground mode harmonic frequencies to be filtered in rad/s then $\Omega_{pm}^2 = 1 \div (L3 \times C3)$ and $\Omega_{gm}^2 = 1 \div ([2 \times L4 + L3] \times C3)$. Thus, the values for L3, C3, and L4 are chosen for each application.

A preferred embodiment of a voltage source converter station according to the invention has been described. A person skilled in the art realizes that this could be varied within the scope of the appended claims. Thus, a simple filter design has been described. It is realized that this design can be more complex.

The invention claimed is:

1. A DC filter for use in a voltage source converter based HVDC transmission system comprising a first and a second pole line, said filter comprising:
   a first connection point connected to the first pole line,
   a second connection point connected to the second pole line,
   a third connection point connected to ground,
   two LC filters serially connected between the first and the second connection point, and
   an inductor provided between ground and a junction between the two LC filters,
   wherein values of the LC filters and the inductor are chosen so that $\Omega_{pm}^2 = 1 \div (L3 \times C3)$ and $\Omega_{gm}^2 = 1 \div ([2 \times L4 + L3] \times C3)$, wherein $\Omega_{pm}$ are pole mode harmonic frequencies and $\Omega_{gm}$ are ground mode harmonic frequencies to be filtered in rad/s.

2. A converter station, comprising:
   a DC filter comprising a first connection point connected to a first pole line, a second connection point connected to a second pole line, a third connection point connected to ground, two LC filters serially connected between the first and the second connection point, and an inductor provided between ground and a junction between the two LC filters, wherein values of the LC filters and the inductor are chosen so that $\Omega_{pm}^2 = 1 \div (L3 \times C3)$ and $\Omega_{gm}^2 = 1 \div ([2 \times L4 + L3] \times C3)$, wherein $\Omega_{pm}$ are pole mode harmonic frequencies and $\Omega_{gm}$ are ground mode harmonic frequencies to be filtered in rad/s.

3. The converter station according to claim 2, further comprising:
   a voltage source converter comprising semiconductor valves comprising branches of gate turn on/turn off semiconductor elements.

* * * * *